US009565628B2

(12) United States Patent
Chiang et al.

(10) Patent No.: US 9,565,628 B2
(45) Date of Patent: Feb. 7, 2017

(54) ENERGY SAVING FUNCTIONALITY FOR SMALL CELLS IN E-UTRA AND E-UTRAN

(71) Applicants: MEDIATEK INC., Hsinchu (TW); National Taiwan University, Taipei (TW)

(72) Inventors: Yi-Han Chiang, Keelung (TW); Yu-Chun Chen, Taipei (TW); Kun-Lin Ho, Kaohsiung (TW); Po-Han Huang, Changhua (TW); Po-Han Chiang, New Taipei (TW); Chen-Yi Chang, Taichung (TW); Wan-Jiun Liao, Taipei (TW); Shiang-Jiun Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 294 days.

(21) Appl. No.: 14/321,810

(22) Filed: Jul. 2, 2014

(65) Prior Publication Data
US 2015/0009877 A1    Jan. 8, 2015

Related U.S. Application Data

(60) Provisional application No. 61/842,468, filed on Jul. 3, 2013.

(51) Int. Cl.
*H04W 16/26* (2009.01)
*H04W 52/02* (2009.01)
(Continued)

(52) U.S. Cl.
CPC ..... *H04W 52/0206* (2013.01); *H04W 36/0072* (2013.01); *H04W 36/165* (2013.01); *H04W 84/045* (2013.01); *Y02B 60/50* (2013.01)

(58) Field of Classification Search
CPC ............... H04W 52/0206; H04W 36/0072; H04W 36/165; H04W 84/045; Y02B 60/50

See application file for complete search history.

(56) References Cited

U.S. PATENT DOCUMENTS

| 8,515,410 B1 * | 8/2013 | Bach ................. H04W 52/0206 |
| | | 455/418 |
| 2012/0082064 A1 * | 4/2012 | Awoniyi ............... H04W 24/10 |
| | | 370/255 |

(Continued)

FOREIGN PATENT DOCUMENTS

| CN | 101977403 A | 2/2011 |
| CN | 103052112 A | 4/2013 |
| EP | 2453706 A1 | 5/2012 |

OTHER PUBLICATIONS

International Search Report and Written Opinion of International Search Authority for PCT/CN2014/081586 dated Oct. 10, 2014 (13 pages).

*Primary Examiner* — Jay P Patel
(74) *Attorney, Agent, or Firm* — Imperium Patent Works; Zheng Jin; Helen Mao (57) ABSTRACT

Apparatus and method are provided for small cell energy saving. In one novel aspect, switch-off-request is broadcasted by the small cell detecting the low-load condition. The small cells upon receiving the switch-off-request message enter the frozen state, which prevents the small cells from switching off. In another novel aspect, the small cell in the low-load condition request measurement reports from the UEs. The UEs replies with the measurement-reports message, which includes the detected neighboring IDs and the UE's traffic load. The low-load small cell includes the information derived from the measurement-reports in the switch-off-request message. In another novel aspect, the small cell broadcasts the switch-on-request message. Upon receiving switch-on-acknowledge messages from switched- (Continued)

off neighboring small cells, the small cell selects one or more target cells to send the cell-activation-request. The switched-off small cells, upon receiving the request to switch-on, uses a cost function to determine whether to switch on.

21 Claims, 8 Drawing Sheets

(51) Int. Cl.
*H04W 36/00* (2009.01)
*H04W 36/16* (2009.01)
*H04W 84/04* (2009.01)

(56) References Cited

U.S. PATENT DOCUMENTS

| | | | | |
|---|---|---|---|---|
| 2012/0184311 A1* | 7/2012 | Yamamoto | ......... | H04W 56/002 455/502 |
| 2012/0250638 A1* | 10/2012 | Wang | .................. | H04W 28/04 370/329 |
| 2013/0114577 A1* | 5/2013 | Cai | ....................... | H04L 5/0053 370/336 |
| 2013/0250908 A1* | 9/2013 | Bach | ................. | H04W 52/0206 370/331 |
| 2013/0260755 A1* | 10/2013 | Seo | .................... | H04W 52/0206 455/435.1 |
| 2013/0286919 A1* | 10/2013 | Kawashima | ...... | H04W 52/0206 370/311 |
| 2014/0213239 A1* | 7/2014 | Hahn | ................... | H04W 16/08 455/418 |
| 2014/0228037 A1* | 8/2014 | Hahn | ................... | H04W 36/04 455/449 |
| 2014/0235218 A1* | 8/2014 | Hahn | ................... | H04W 16/26 455/418 |
| 2014/0301299 A1* | 10/2014 | Wu | ....................... | H04L 5/0053 370/329 |
| 2014/0307591 A1* | 10/2014 | Wang | ................ | H04W 72/1231 370/278 |
| 2014/0362750 A1* | 12/2014 | Song | ................ | H04W 36/0072 370/311 |
| 2015/0359036 A1* | 12/2015 | Seo | ..................... | H04W 76/048 370/329 |
| 2016/0066209 A1* | 3/2016 | Lin | ....................... | H04W 48/06 370/230 |

* cited by examiner

ENERGY SAVING FUNCTIONALITY FOR SMALL CELLS IN E-UTRA AND E-UTRAN

CROSS REFERENCE TO RELATED APPLICATIONS

This application claims priority under 35 U.S.C. §119 from U.S. Provisional Application No. 61/842,468, entitled "Energy Saving Functionality for Small Cells in E-UTRA and E-UTRAN", filed on Jul. 3, 2013, the subject matter of which is incorporated herein by reference.

TECHNICAL FIELD

The present invention relates generally to small cell management in a wireless network, more specifically relates to energy saving functionality for small cells in E-UTRA and E-UTRAN.

BACKGROUND

The explosive growth of mobile data demands tremendous growth of mobile service coverage and network capacity. A promising solution is to offload data traffic to small cells, such as micro cells, pico cells and femto cells. The small cells can be deployed at hotspot areas within a cellular macro cell. Small cells provide low power, low cost and efficient connectivity and coverage for all users. The increasing popularity of smart phones and tablet also drives the exponential growth in small cell deployment.

One of the main issue with the exponential growth of small cells deployment is energy saving. The traffic pattern of a small cell may fluctuate sharply. A small cell designed to support a peak traffic is inevitably under used when the traffic dramatically reduced or even disappeared. For example, the traffic of a small cell serving a conference room is designed to support a large number of users during a meeting. The traffic needs of this small cell may be dramatically reduced during other time. With the exponential growth of the small cell deployment, it is important to address the energy saving issue for the small cells when underutilized.

One solution is network-based energy saving for small cells. This approach has low impact on base stations. However, it has high network impact because it involves high complexity OAM implementation and increases costly wireless core network overhead. Further, costly network upgrade makes such centralized solution hard to make dynamic changes. As the technology for small cell and other wireless is evolving rapidly, these shortcomings make such solution less appealing.

The other solution to the energy saving for small cells is signal-based solution. Its major impact is on base stations. However, it offers very low core network impact and requires few core network overhead. Further, signal-based solution offers more flexibility for dynamic changes. Therefore, signal-based energy saving for small cells is a preferred solution.

Though signal-based solution has advantages over the network-based solutions, several problems exist. Small cell energy saving requires switching off underutilized small cells and switching on neighboring small cells to offload traffic when needed. The problem with the existing switching off scheme occurs when two or more neighboring small cells switching off independently upon detecting the low traffic load of their own. Switching-off small cells hand off their traffic to the neighboring small cells. When multiple small cells switching off at the about the same time, the traffic load to the neighboring small cells increases dramatically, resulting in the neighboring cell overloading. Problems exist for the current switch-on scheme as well. The first problem is activating unhelpful small cells. Upon detecting a high traffic load, the small cell broadcast the switch-on request to its neighboring cells, resulting in unnecessarily activating small cells. The second problem is the small cells switches on upon receiving switch-on request from neighbor cells. Upon switching on, the small cell determines that the traffic load is below the low traffic threshold triggering the switch off procedures. During switching off, the traffic is handed over to the previous small cell resulting in the higher than the high-threshold traffic. Such ping-pong effect makes the current switch-on scheme problematic as well.

Improvements and enhancements are required to provide more efficient and reliable energy saving method for small cells.

SUMMARY

Apparatus and methods are provided for small cell energy savings. In one novel aspect, switch-off procedures are provided for small cell power savings. In the switched-off state, small cell can turn off its radio transceiver for UEs and keep the X2 interface connections to other cells activate. During the switched-off period, the small cell can periodically broadcast its reference signal for UEs to discover it. The periodicity of the reference signal broadcasting can be configurable. In one embodiment, the small cell receives switch-off-request message from a neighboring small cell. Upon receiving this switch-off-request message, the small cell enters a frozen state. In the frozen state, the small cell freezes switch-off procedures such that it will not perform its own switch-off procedures even when detecting the low-load condition. In one embodiment, the small cell detecting a low-load condition in its frozen state and stays in the frozen state without performing switches-off procedures. In another embodiment, the switch-off-request message includes a freeze-timeout value. The small cell starts a freeze timer with the freeze-timeout value upon entering the frozen state. Upon expiration of the freeze timer, the small cell exits the frozen state. In yet another embodiment, the small cell replies a switch-off-acknowledge message in the frozen state if the small cell can take handoff traffics. The switching-off small cell upon receiving the switch-off-acknowledge message, sends the load-request message to the neighboring small cell.

In another novel aspect, the small cell in a low-load condition sends control-measurement message to the UEs in the small cell. The UEs, upon receiving the control-measurement message, replies with a measurement-reports message. In one embodiment, the measurement-reports message includes the detected neighboring cell IDs and the traffic load of the UE. The traffic load of the UE can be the buffer status report or some simply quantized indicators to reflect the UE's traffic load, for example, an indicator of {low, medium, high}. The small cell builds the switch-off-request message based on the received measurement-reports messages. The switch-off-request message includes a total amount of handoff traffic based on the received measurement-reports messages.

In yet another novel aspect, switch-on procedures are provided for small cell energy saving. In one embodiment, the switch-on-request message is broadcasted by a small cell with high-load condition to its entire neighboring small cells. The neighboring small cells in the switched-off state reply with the switch-on-acknowledge message. In one embodiment, the high-load small cell selects one or more target cells and sends the cell-activation-request message to the selected target cells. In another embodiment, the target cells receiving the cell-activation-request message determines whether to switch on using a cost function. In one embodiment, the cost function considers the amount of handoff traffic requested in making the decision. In another embodiment, more information, such as the frequency of the switch-on requests, is considered. The small cell switches on if it determines the switch-on condition is positive.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
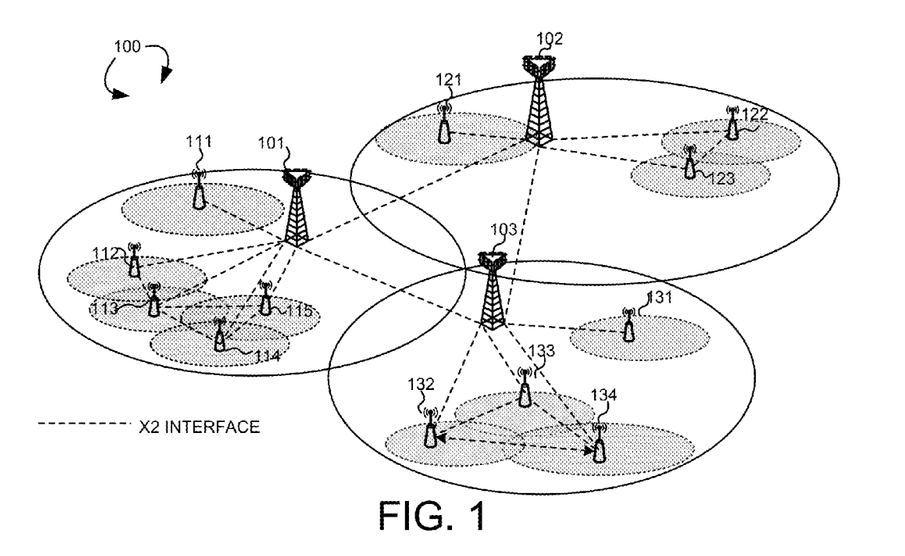
FIG. 1 is an exemplary diagram of a wireless network with small cells within multiple macro cells in accordance with embodiments of the current invention.

FIG. 1 is an exemplary diagram of a wireless network 100 with small cells within multiple macro cells in accordance with embodiments of the current invention. Signal-based small cell energy saving solution uses X2 interfaces between the small cell and its serving macro cell. X2 interfaces also enable neighboring small cells to communicate with each other. In one embodiment of the current invention, small-cell-to-small-cell X2 interface and small-cell-to-macro-cell X2 interface are used to send energy saving messages. Wireless network 100 includes three macro cells served by three macro-cell base stations 101, 102 and 103. Macro-cell base stations are connected with X2 interfaces among themselves. Multiple small cells reside within each macro cell. Five small cells, served by small cell base stations 111, 112, 113, 114 and 115, reside within the macro cell served by macro base station 101. Each of the small cell base stations connects with macro-cell base station 101 with the X2 interface. In addition, small cell base station 112 is connected with its neighboring small cell base station 113 with the X2 interface. Small cell base stations 113, 114 and 115, serving neighboring small cells, are connected with each other with the X2 interfaces. Similarly, three small cells, served by small cell base stations 121, 122 and 123, reside within the macro cell served by macro base station 102. Each of the small cell base stations connects with macro-cell base station 102 with the X2 interface. In addition, small cell base station 122 is connected with its neighboring small cell base station 123 with the X2 interface. Further, as illustrated, four small cells, served by small cell base stations 131, 132, 133, and 134, reside within the macro cell served by macro base station 103. Each of the small cell base stations connects with macro-cell base station 103 with the X2 interface. In addition, small cell base stations 132, 133 and 134, serving neighboring small cells, are connected with each other with the X2 interfaces. The X2 interface uses backhaul connections to connect the small cells and macro cells forming a signaling network among the macro cells and the small cells.

Figure 2:
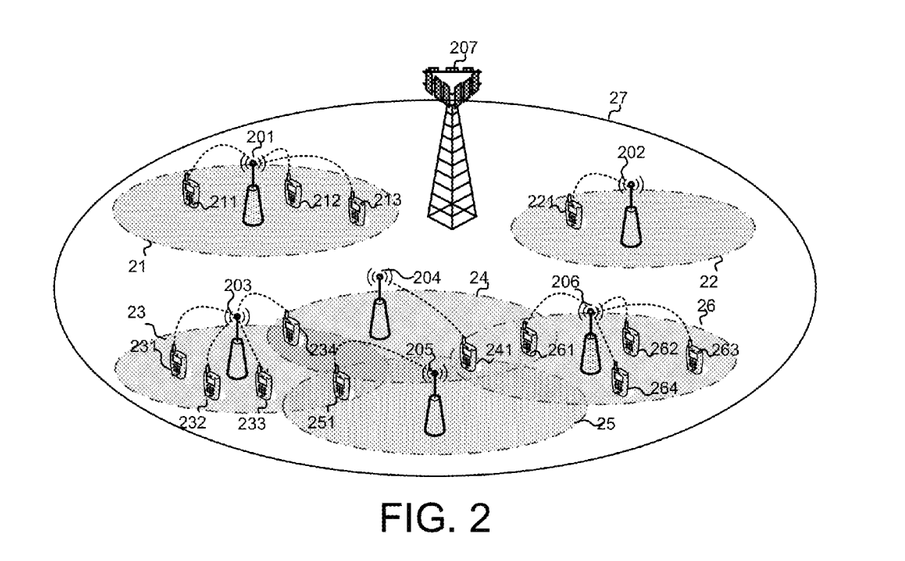
FIG. 2 shows an exemplary diagram of multiple small cells serving different traffic load within a macro cell in accordance with embodiments of the current invention.

FIG. 2 shows an exemplary diagram of multiple small cells serving different traffic load within a macro cell in accordance with embodiments of the current invention. A macro cell 27 is served by a macro-cell base station 207. Several small cells, 21, 22, 23, 24, 25 and 26, are deployed with macro cell 27. Different traffic patterns exist for different small cells and vary sharply over time. In accordance with embodiments of the current invention, dynamic algorithm is used to efficiently perform small-cell energy saving.

Small cell 21 is served by a small cell base station 201. Small cell 21 does not have other neighboring small cells. As illustrated, small cell 21 has a high traffic load. UEs 211, 212 and 213 are served by small-cell base station 201. When the traffic in small cell 21 is higher than a predefined high-load threshold, small cell 21 would perform switch-on procedure to hand off some of its traffic. Since small cell 21 does not have neighboring small cells to hand off the traffic, small cell 21 relies on macro cell 27 to offload its traffic. In one embodiment of the current invention, if the small cell failed switch-on procedure, it would hand off some of its traffic to the macro cell. Similarly, small cell 22, served by a small-cell base station 202, does not have any other neighboring small cells. As illustrated, small cell 22 only has one UE, UE 221. Consequently, small-cell base station 202 determined to switch off according to a predefine algorithm. Small-cell base station 202 attempts to hand off its traffic to other small cell base station. Since small cell 22 does not have any neighboring small cells, the hand off attempt fails. In one embodiment, small-cell base station 202 would hand off the traffic from UE 221 to macro-cell base station 207.

In other examples, small cells 23, 24 and 25 are neighboring small cells, served by small-cell base stations 203, 204 and 205, respectively. Similarly, small cells 24, 25 and 26 are neighboring small cells. Small cell 26 is served by a small-cell base station 206. Small cell 23 has high-load traffic, serving UEs 231, 232, 233 and 234. UE 234 is connected with small cell 23 and is within the range of small cell 24 at the same time. Similarly, small cell 26 has high-load traffic as well, serving UEs 261, 262, 263 and 264. UE 261 is connected with small cell 26 and is within the range of small cell 24 at the same time. On the other hand, small cell 24 serves only one UE, UE 241. Similarly, small cell 25 serves only one UE, UE 251. Both small cell 24 and small cell 25 have low-load traffic. In addition, UE 241 is connected with small cell 24 and is within the range of small cells 25 and 26 at the same time. UE 251 is connected with small cell 25 and is within the range of small cells 23 at the same time. Upon detecting the low-load condition, small cells 24 and 25 both attempt to switch off by first handing off the traffic to the neighboring small cells. Since neighboring small cells 23 and 26 are both in high-load traffic condition, the handoff will eventually fail to create a ping-pong situation when the congested small cells 23 and/or 26 attempt to switch on small cell 24 and/or small cell 25 right after they switched off. In one embodiment of the current invention, small cell 24 would send the switch-off-request message to its neighbor cells. Each neighboring small cell upon receiving the switch-off-request message would enter a frozen state, which prohibits the small-cell base station to attempt switching off. As illustrated, after small cell 24 broadcasts the switch-off-request message, if subsequently, small cell 25 detects low-load condition, it would not attempt switch off procedure because it is the frozen state.

Figure 3:
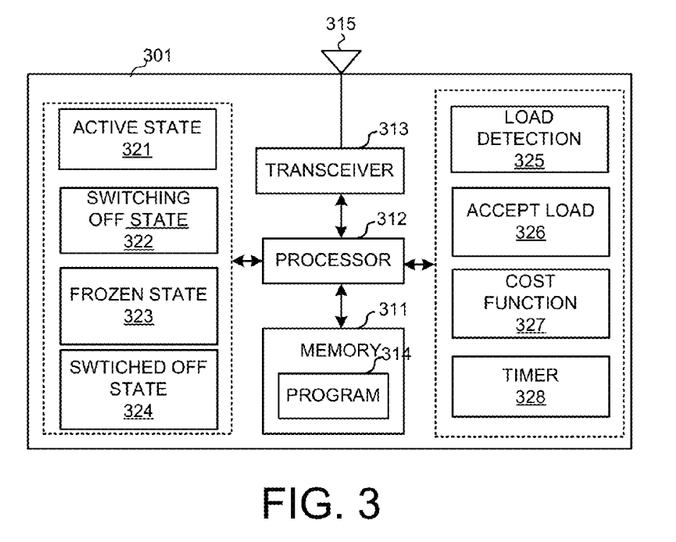
FIG. 3 is a simplified block diagram of a small cell base station in accordance with novel aspects of the current invention.

FIG. 3 is a simplified block diagram of a small cell base station 301 in accordance with novel aspects of the current invention. Small cell base station 301 comprises memory 311, a processor 312, a transceiver 313 coupled to an antenna 315. A computer executable program 314 resides in memory 311. Small cell 301 also comprises various function modules including an active state handler 321, a switching-off state handler 322, a frozen state handler 323, a switched-off state handler 324, a load detection module 325, an accept-load module 326, a cost-function module 327 and a timer handler 328. Active state handler 321 handles messages received in the active state. It also monitors internal conditions and determining whether to stay in the active state or transit to another state, including switching-off state and frozen state. In one novel aspect, upon receiving the switch-off-request from a neighboring small cell, active state handler 321 determines to enter the frozen state. Switching-off state handler 322 handles messages received in the switching-off state. It also monitors internal conditions and determines whether to stay in the switching-off state or transit to another state. Frozen state handler 323 handles messages received in the frozen state. It also monitors internal conditions and determines whether to stay in the frozen state or transit to another state. In one novel aspect, upon detecting a low-load condition, frozen state handler 323 determines to stay in the frozen state without performing switching-off procedure In another novel aspect, frozen state handler 323 determines to exit the frozen state and to go back to the active state upon detecting exit-frozen-state condition, such as the expiration of the waiting period timer. Switched-off state handler 324 handles messages received in the switched-off state. It also monitors internal conditions and determines whether to stay in the switched-off state or transit to another state. In one novel aspect, upon receiving the cell-activation-request message, switched-off state handler 324 further determines one or more internal conditions based on the message. Switched-off state handler 324 determines to stay in the switched-off state based on the internal condition or to transit back to the active state. Load detection module 325 monitors and detects a load condition based on predefined algorithms. In one embodiment, load detection module 325 determines a low-load condition if the current traffic load of the small cell is lower than a predefined low-load value. Load detection module 325 determines a high-load condition if the current traffic load of the small cell is higher than a predefined high-load value. Accept load module 326 determines whether to accept additional handoff traffic from its neighboring small cells based on a predefined algorithm and messages received. Cost function module 327 performs a cost function analysis based on the received one or more messages from the one or more neighboring small cell and determines if it is cost-effective to switch on the switched-off small cell. Timer handler 328 handles timer events.

Figure 4:
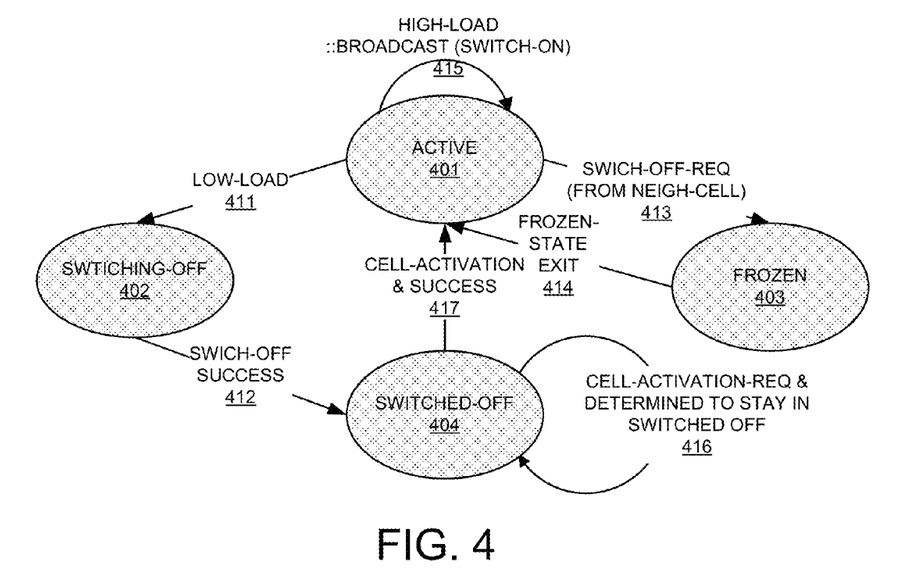
FIG. 4 is a simplified state transition diagram for a small cell base station performing energy saving procedures in accordance with embodiments of the current invention.

FIG. 4 is a simplified state transition diagram for a small cell base station performing energy saving procedures in accordance with embodiments of the current invention. The small cell base station has four top-level states, an active state 401, a switching-off state 402, a frozen state 403 and a switched-off state 404. At step 411, the small cell base station detects the low-load condition. The small cell broadcasts the switch-off-request message and transits to switching-off state 402. In one embodiment, the small cell receives one or more switch-off-acknowledge messages from neighboring small cells. The small cell then performs handoff procedure based on the received one or more switch-off-acknowledge messages. Upon a successful handover, at step 412, the small cell moves to switched-off state 404. At step 413, in active state 401, if the small cell receives the switch-off-request, it moves to frozen state 403. In one embodiment of the current invention, if the small cell detects low-load condition in frozen state 403, it stays in frozen state 403 without switching-off attempts. At step 414, if the small cell detects one or more exit-frozen-state events, the small cell moves back to active state 401. At step 415, the small cell detects high-load condition in active state 401. The small cell stays in active state 401 and broadcasts the switch-on message to its neighboring small cells. In switched-off state 404 and step 416, if the small cell receives cell-activation-request message but determined, based on other internal conditions, that switch-on is not efficient, it stays in switched-off state 404. On the other hand, in switched-off state 404 and step 417, if the small cell receives cell-activation-request message and determined, based on other internal conditions, that switch-on is efficient, it switches on and moves to active state 401.

Figure 5:
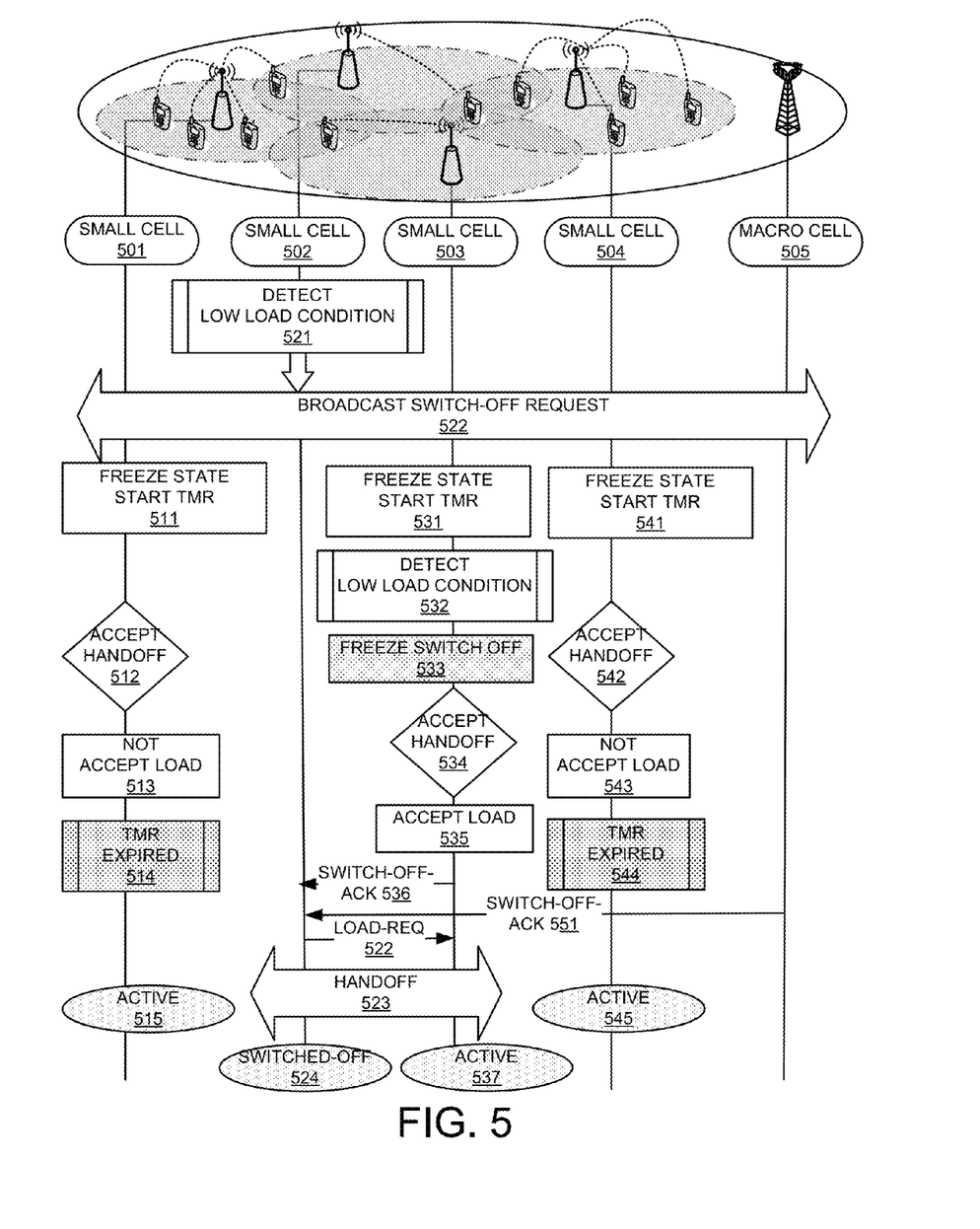
FIG. 5 is an exemplary sequence diagram of the switch-off procedure for small cell energy saving in accordance with embodiments of the current invention.

FIG. 5 is an exemplary sequence diagram of the switch-off procedure for small cell energy saving in accordance with embodiments of the current invention. Small cells 501, 502, 503 and 504 reside within a macro cell 505. Small cells 501, 502 and 503 are neighboring small cells with each other. Small cells 502, 503 and 504 are neighboring cells with each other. Small cells 501 and 504 have a high traffic load. Small cells 502 and 503 have a low traffic load. At step 521, small cell 502 detects a low-load condition. In one embodiment, a low-load condition is determined when the current traffic load is a below a predefined low-load-threshold. The low-load-threshold can be preconfigured or dynamically changed. The determination of the low-load condition can be based on a predefined algorithm, such as monitoring the traffic load and obtaining an average value of the traffic over a predefined period. Upon determining that the low-load condition, at step 521, in small cell 502 broadcasts the switch-off-request message to its neighboring small cells 501, 503,504 and macro cell 505. In one embodiment, the switch-off-request message includes a requesting time and a freeze-timeout value. The requesting time is the sending time of the switch-off-request message. The freeze-timeout value is a timer value, which the receiving small cell should wait before it exits the frozen state. At step 511, small cell 501 upon receiving the switch-off-request message enters the frozen state. In one embodiment, small cell 501 starts the freeze timer with the received freeze-timeout value. Similarly, at step 531, small cell 503 upon receiving the switch-off-request message enters the frozen state and starts the freeze timer with the received freeze-timeout value. At step 541, small cell 504, upon receiving the switch-off-request message, enters the frozen state and starts the freeze timer with the received freeze-timeout value. After entering the frozen state, at step 532, small cell 503 detects low-load condition. At step 533, small cell 503 freezes its switching-off attempts since it is in the frozen state.

In another embodiment, the switch-off procedure for small cell energy saving involves an acknowledgement protocol to handoff the traffic from the switching-off small cell. At step 512, upon receiving the switch-off-request message, small cell 501 determines if it can take additional traffic from neighboring small cells using an accept-handoff procedure. The accept-handoff procedure is based on the received switch-off-request message and internal conditions of the small cell. In one embodiment, when the traffic condition of the small cell is higher than a predefined accept-handoff-threshold, the small cell determines not to accept the handoff traffic. When the traffic load is lower than or equals to a predefined accept-handoff-threshold, the small cell determines to accept the handoff traffic. Based on the accept-handoff procedure, at step 513, small cell 501 determines that it would accept the handoff traffic from small cell 502. Small cell 501 stays in the frozen state and continues to monitor its traffic condition if it determines that it would not accept the handoff traffic. Similarly, at step 542, upon receiving the switch-off-request message, small cell 504 determines if it can take additional traffic from neighboring small cells using an accept-handoff procedure. Based on the accept-handoff procedure, at step 543, small cell 504 determines that it would not accept the handoff traffic from small cell 502. Small cell 504 stays in the frozen state and continues to monitor its traffic condition. Small cell 503 determines whether it would accept handoff traffic at step 534. At step 535, small cell 503 determines that it would accept additional handoff traffic from small cell 502. Small cell 503, at step 536, sends switch-off-acknowledge message to small cell 502. At step 522, small cell 502, upon receiving switch-off-acknowledge message, sends a load-request message to small cell 503. At step 523, small cell 502 performs handoff procedure with small cell 503. At step 551, macro cell 505 also sends switch-off-acknowledge message to small cell 502. Using the acknowledgment protocol, the switching off small cell would not broadcast the load-request message to all its neighboring small cells, instead, the load-request message is sent only to the small cells that would be able to accept the handoff traffic.

In one embodiment, the small cell in the frozen state exits upon detecting exit-frozen-state conditions. One of the exit-frozen-state condition is the expiration of the freeze timer. As illustrated, at step 514, small cell 501 detects the freeze timer expired. At step 515, small cell 501 moves back to active state. Similarly, at step 544, small cell 504 detects the freeze timer expired. At step 545, small cell 504 moves back to active state. Another exit-frozen-state condition is the detection of the completion of the switch-off procedure from the requesting small cell. As illustrated, small cell 503, at step 537, upon detecting the handoff completion procedure with small cell 502, exits frozen state and moves back to active state.

Figure 6:
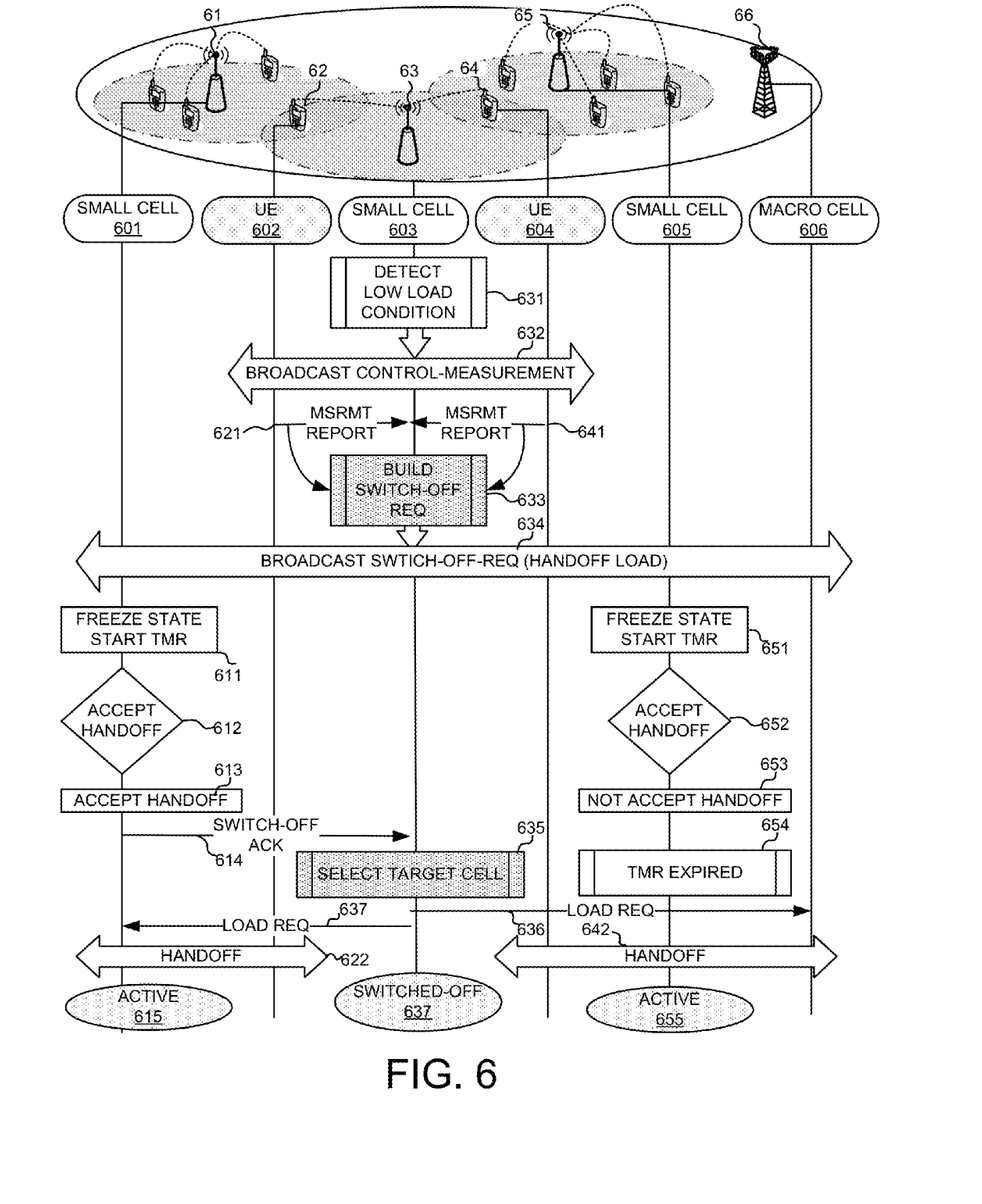
FIG. 6 shows an exemplary message sequence diagram for a small cell switch-off procedure to include handoff traffic information in the request by using control measurement reports from UEs.

The improvement of the switch-off procedure for small cell energy saving enables the small cell to better manage the switch-off process. A further improvement for the switch-off procedure is to include handoff traffic information in the switch-off-request message. FIG. 6 shows an exemplary message sequence diagram for a small cell switch-off procedure to include handoff traffic information in the request by using control measurement reports from UEs. Small cells 601, 603, and 605, served by small cell base stations 61, 63 and 65, respectively, reside within a macro cell 606, served by a macro-cell base station 66. Small cell 601 and small cell 602 are neighboring small cells. Small cell 602 and small cell 603 are neighboring small cells. UEs 62 and 64 are connected with small cell base station 63. UE 62 is also within the coverage of small cell 601, while UE 64 is also within the coverage of small cell 65. At step 631, small cell 603 detects low-load condition. In preparing for switch-off-request message, small cell 603 broadcasts the control-measurement message to all its UEs. At step 621, upon receiving the control-measurement message, UE 62 sends a measurement-reports message. In one embodiment, the measurement-reports message includes detected neighboring cell IDs and the traffic load information of the UE. As illustrated, UE 62 reports small cell 601 as its detected neighboring cell and the traffic load of its own. Similarly, at step 621, upon receiving the control-measurement message, UE 64 sends a measurement-reports message. UE 64 reports small cell 605 as its detected neighboring cell and the traffic load of its own. At step 633, small cell 603 builds the switch-off-request message based on the received measurement-reports messages from UE 62 and UE 63. At step 634, small cell 603 broadcasts the switch-off-request message, which includes a handoff traffic information based on the measurement-reports messages received from UEs. At step 611, small cell 601 enters the frozen state and starts the freeze timer. Similarly, at step 651, small cell 605 enters then frozen state and starts the freeze timer. At step 612, small cell 601 determines if it would accept the handoff request from small cell 603. At step 652, small cell 605 determines if it would accept the handoff request from small cell 603. At step 613, small cell 601 determines that it can accept handoff traffic. At step 614, small cell 601 sends switch-off-acknowledge message to small cell 603. At step 652, small cell 605 determines if it would accept handoff traffic. At step 653, small cell 605 determines that it would not accept handoff traffic and does not send the switch-off-acknowledge message to small cell 603. At step 635, small cell 603 selects target cell to handoff its traffic. In one embodiment, small cell 603 selects target cells based on the received switch-off-acknowledge message. In another embodiment, small cell 603 selects target cells based on the received measurement-reports messages from the UEs as well. As illustrated, small cell 603 selects small cell 601 as a target cell based on the received switch-off-acknowledge message from small cell 603, and the measurement-reports message from UE 62 indicating small cell 601 as a neighboring cell. At step 637, small cell 603 sends load-request message to small cell 601. At step 622, UE 62 performs handoff procedure to connect with small cell 601. Small cell 601, at step 615, exits frozen state and moves back to active state. At step 635, small cell 603 determines that there is no neighboring small cell available for UE 64. UE 64 indicates in the measurement-reports message that small cell 605 is its detected neighboring cell. Since small cell 603 does not receive switch-off-acknowledge message from small 605, small cell 603 further selects macro cell 606. At step 642, UE 64 performs the handoff procedure and connects to macro cell 606. Upon finishing traffic handoffs, small cell 603, at step 637, enters switched-off state. At step 654, small cell 605 detects the freeze timer expired. At step 655, small cell 605 exits frozen state and moves back to active state.

Figure 7:
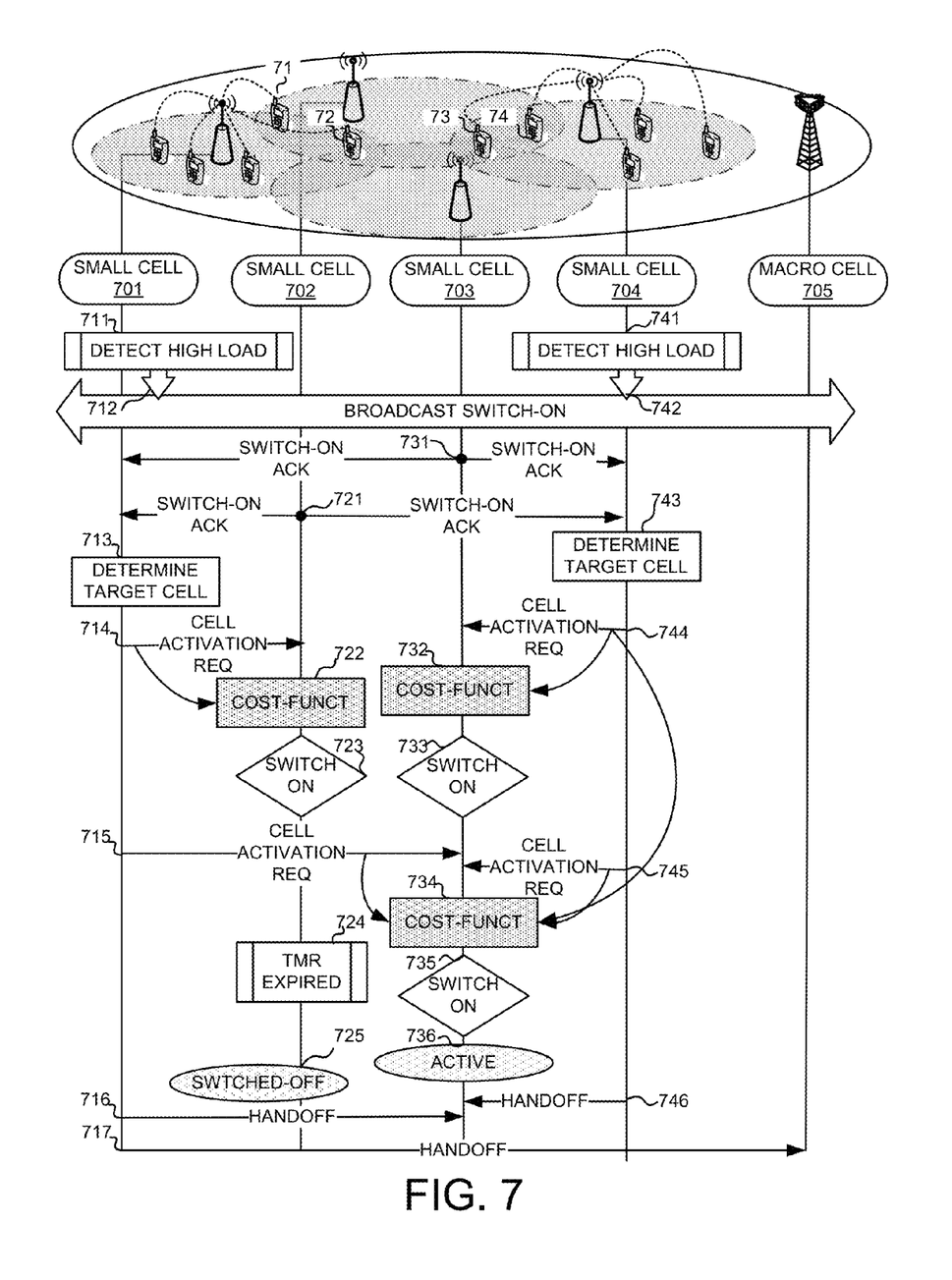
FIG. 7 illustrates a switch-on procedure for small cell energy saving in according to embodiments of the current invention.

In another novel aspect, the switch-on procedure for small cell power saving involves using a cost function by the switched-off small cell to determine whether to switch on. FIG. 7 illustrates a switch-on procedure for small cell energy saving according to embodiments of the current invention. Small cells 701, 702, 703 and 704 reside within a macro cell 705. Small cells 702 and 703 are both in the switched-off state and do not carry any traffic load. UEs 71 and 72 both connect to small cell 701. UEs 73 and 74 both connect to small cell 704. Further, UEs 71 and 74 are within cell coverage of small cell 702 and small cell 703, respectively. Furthermore, UE 72 and 73 are both within the cell coverage of small cells 702 and 703. At step 711, small cell 701 detects high-load condition. Similarly, at step 741, small cell 704 detects high-load condition. At step 712, small cell 701 broadcasts the switch-on message. At step 742, small cell 704 broadcasts the switch-on message. Upon receiving the switch-on message, the small cell that is in switched-off state replies with the switch-on-acknowledge message. The switch-on-acknowledge message includes the small cell identification information. In one embodiment, the small cell identification information is the E-UTRAN Cell Global Identifier (ECGI). At step 731, small cell 703 replies the switch-on-acknowledge message to small cells 701 and 704. At step 721, small cell 702 sends the switch-on-acknowledge message to small cells 701 and 704.

Upon receiving switch-on-acknowledge messages, the small determines to which small cells to send the cell-activation-request messages. It is not necessary to activate all the switched-off neighboring small cells; instead, the requesting small cell chooses a subset of its neighboring small cells. At step 713, small cell 701 determines target cells based on the received switch-on acknowledge messages. The small cell selects certain small cells to send the cell-activation-request message. In one embodiment, small cells track the status of UEs connecting to it. These statuses are also used to select target cells in switch-on procedures. Small cell 701 determines that UE 71 and UE 72 can be handoff to small cell 702, which is now in the switched-off state. As illustrated, at step 714, small cell 701 sends cell-activation-request message to small cell 702 only without sending to small cell 703. Similarly, at step 743, small cell 704 determines target cells based on the received switch-on acknowledge messages and the statuses of its UEs. Small cell 704 determines that UE 73 and UE 74 can be handoff to small cell 703, which is now in the switched-off state. As illustrated, at step 744, small cell 704 sends cell-activation-request message to small cell 703 only without sending it to small cell 702.

In one embodiment, in the cell-activation-request message, the small cell includes switch-on information that would help the switched-off small cells to determine whether to switch on. The switch-on information includes information such as handoff traffic load. The handoff traffic load can be the total amount of handoff traffic of the requesting small cell. The handoff traffic load can also be different for each receiving small cell. The different traffic load for each receiving small cell can be determined based on the UE measurement information received by the requesting small cell.

In one embodiment, upon receiving the cell-activation-request message, the small cell uses a cost function to determine whether to switch on. The cost function can be preconfigured or dynamically changed. As illustrated, at step 722, small cell 702 performs cost function analysis based on the received cell-activation-request message received from step 714. In this example, the cell-activation-request message includes the handoff traffic amount from UE 71 and UE 72. At step 723, small cell 702 determines whether to switch on based on the output of cost function 722. In this example, small cell 702 determines that the handoff traffic is too low for it to switch on. Small cell 702, thereby, does not switch on. Similarly, at step 732, small cell 703 performs cost function analysis based on the received cell-activation-request message received from step 744. In this example, the cell-activation-request message includes the handoff traffic amount from UE 73 and UE 74. At step 733, small cell 703 determines whether to switch on based on the output of cost function 732. In this example, small cell 703 determines that the handoff traffic is too low for it to switch on. Small cell 703, thereby, does not switch on. At step 724, small cell 702 detects switch-on timer expires. At step 725, small cell 702 stays in the switched-off state.

At step 715, small cell 701 sends cell-activation-request message to small cell 703. In one embodiment, the cell-activation-request may include the total amount of handoff traffic, such as total traffic from UE 71 and UE 72. In another embodiment, the amount of traffic may only include the amount that can be covered by small cell 703, such as the traffic of UE 72. At step 745, small cell 704 sends the cell-activation-message to small cell 703 again. At step 734, small cell 703 performs cost function analysis. In one embodiment, the small cell considers the amount of handoff traffic required by all other small cells. The small cell may also consider the frequency of the request from the other small cells. As illustrated, small cell 703 would consider the amount of traffic included in both messages from steps 715 and 745. Cost function 734 also considers the multiple requests from small cell 704 from the messages in steps 744 and 745. At step 735, small cell 703 determines whether to switch on based on the output of the cost function 734. As illustrated, step 735 determines to switch on based on the messages from other small cells. At step 736, small cell 703 switches on and goes back to the active state. At step 746, small cell 704 performs handover process with small cell 703 and UE 73 connects to small cell 703. At step 716, small cell 701 performs handover process with small cell 703 and UE 72 connects small cell 703. At step 717, when no neighboring small cells can take more traffic, small cell 701 performs handover with macro cell 705.

Figure 8:
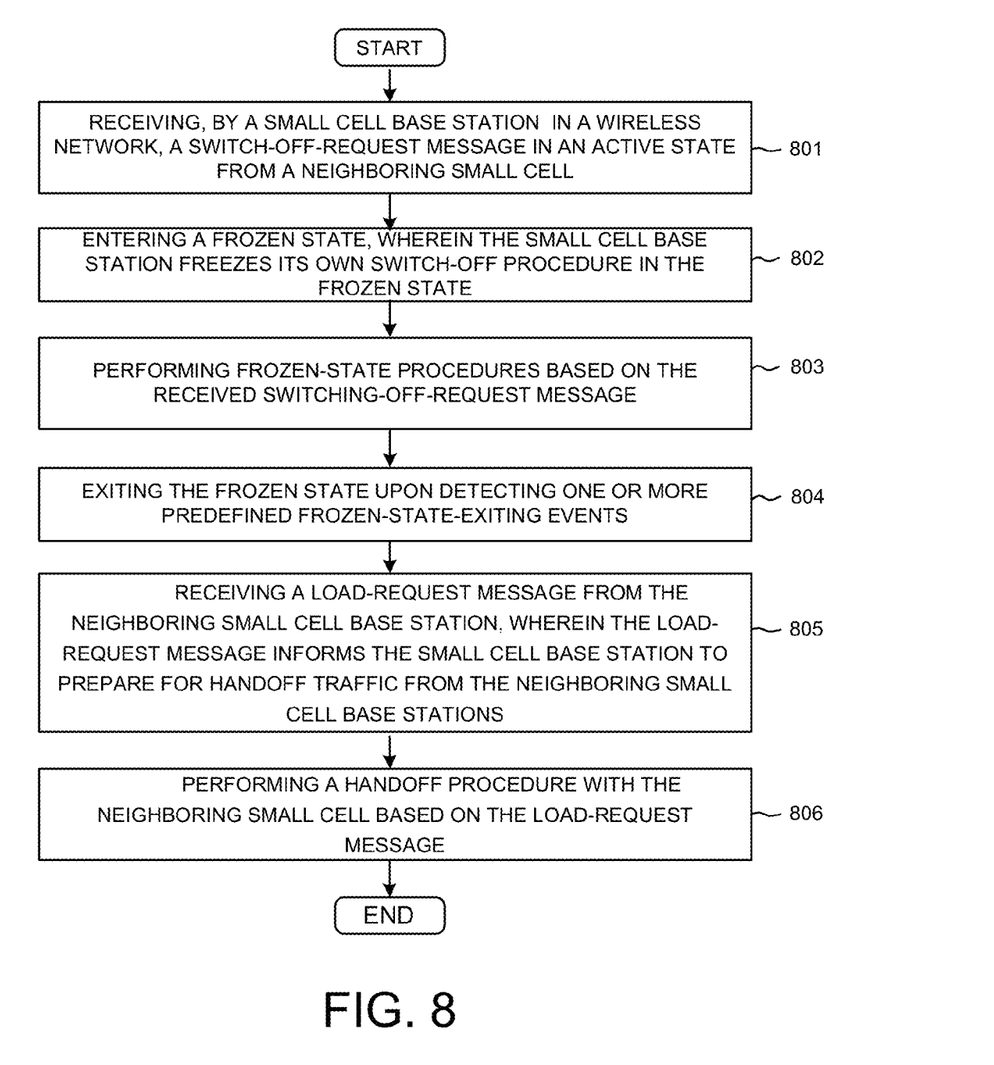
FIG. 8 is an exemplary flow chart of a switch-off procedure for the small cell power savings in accordance with embodiments of the current invention.

FIG. 8 is an exemplary flow chart of a switch-off procedure for the small cell power savings in accordance with embodiments of the current invention. At step 801, the small cell receives a switch-off-request message in an active state from a neighboring small cell. At step 802, the small cell enters a frozen state, wherein the small cell freezes its own switch-off procedure in the frozen state. At step 803, the small ell performs frozen-state procedures based on the received switching-off-request message. At step 804, the small cell exits the frozen state upon detecting one or more predefined exit-frozen-state events. At step 805, the small cell receives a load-request message from the neighboring small cell, wherein the load-request message informs the small cell to prepare for handoff traffic from the neighboring small cell. At step 806, the small cell performs a handoff procedure with the neighboring small cell based on the load-request message.

Figure 9:
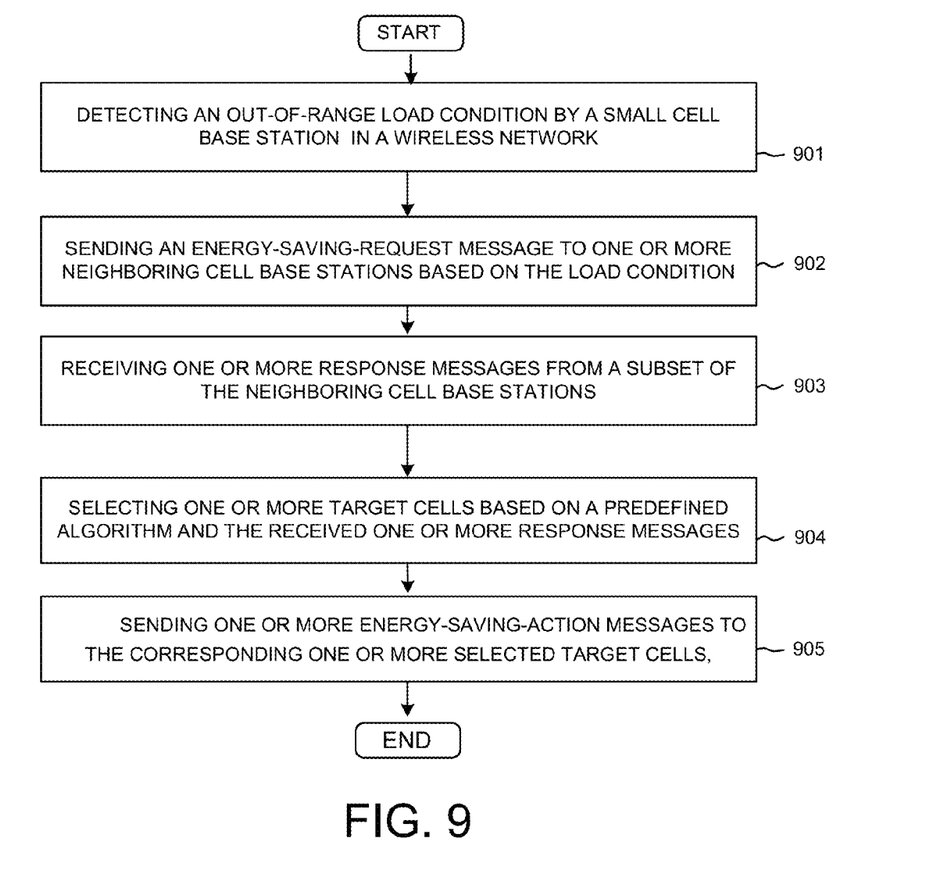
FIG. 9 is an exemplary flow chart of out-of-range load condition handling for the small cell power savings in accordance with embodiments of the current invention.

FIG. 9 is an exemplary flow chart for the out-of-range load condition handling for small cell power savings in accordance with embodiments of the current invention. At step 901, the small cell detects an out-of-range load condition, wherein the small cell is in an active state, and wherein the out-of-range condition is either a high-load condition or a low-load condition. At step 902, the small cell sends an energy-saving-request message to one or more neighboring cells based on the load condition, wherein the energy-saving message is a switch-off-request message if the load condition is the low-load condition and the energy-saving message is a switch-on-request message if the load condition is the high-load condition. At step 903, the small cell receives one or more response messages from a subset of the neighboring cells, wherein the response message is a switch-off-acknowledge message in response to the switch-off-request message indicating being able to accept handoff traffic from the small cell, and the response message is a switch-on-acknowledge message in response to the switch-on-request messages indicating the corresponding neighbor cell is in a switched-off state. At step 904, the small cell selects one or more target cells based on a predefined algorithm and the received one or more response messages. At step 905, the small cell sends one or more energy-saving-action messages to the corresponding one or more selected target cells, wherein the energy-saving action message is a load-request message in the low-load condition and a cell-activation-request message in the high-load condition.

Figure 10:
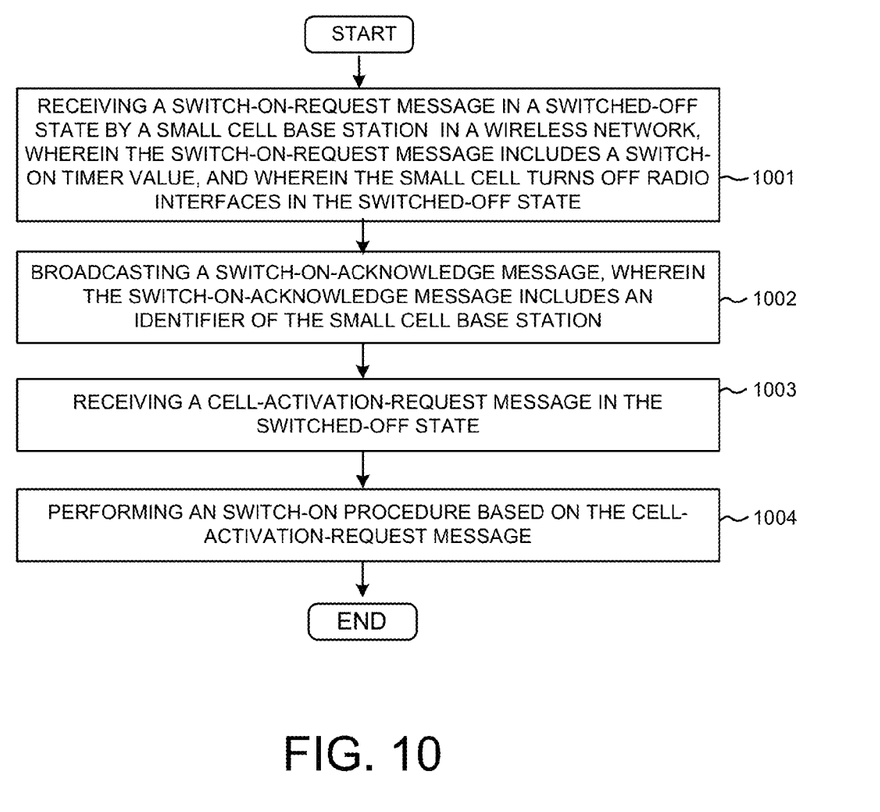
FIG. 10 is an exemplary flow chart of a switch-on procedure for small cell power savings in accordance with embodiments of the current invention.

FIG. 10 is an exemplary flow chart of a switch-on procedure for small cell power savings in accordance with embodiments of the current invention. At step 1001, the small cell receives a switch-on-request message in a switched-off state, wherein the switch-on-request message includes a switch-on timer value, and wherein the small cell turns off radio interfaces in the switched-off state. At step 1002, the small cell broadcasts a switch-on-acknowledge message, wherein the switch-on-acknowledge message includes an identifier of the small cell. At step 1003, the small cell receives a cell-activation-request message in the switched-off state. At step 1004, the small cell performs a switch-on procedure based on the cell-activation-request message.

It is understood by one of ordinary skills in the art that small cell is used throughout as generically referring to control entities of the small cell, such a base station of the small cell.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving, by a small cell base station in a wireless network, a switch-off-request message in an active state from a neighboring small cell base station, wherein the switch-off-request message contains a requesting time and a freeze-timeout value;
entering a frozen state, wherein the small cell base station freezes its own switch-off procedure in the frozen state, wherein the small cell base station starts a freeze timer with the freeze-timeout value upon entering the frozen state;
performing frozen-state procedures based on the received switching-off-request message; and
exiting the frozen state upon detecting one or more predefined exit-frozen-state events.

2. The method of claim 1, wherein the frozen-state procedure involves:
detecting a switch-off condition, wherein the switch-off condition is an amount of traffic of the small cell base station is lower than a predefined low-load-threshold, and wherein the small cell base station switches off radio communications with user equipments (UEs) in the switched-off state;
staying in the frozen state without switching off radio communications with UEs.

3. The method of claim 1, wherein the frozen-state procedure involves:
monitoring and determining an accept-handoff condition; and
sending a switch-off-acknowledgement message to the neighboring small cell base station before the freeze timer expires if the accept-handoff condition is positive, otherwise staying in the frozen state before the freeze timer expires without sending the switch-off-acknowledge message.

4. The method of claim 1, wherein the switch-off-request message further comprises a required handoff traffic, and wherein the small cell base station determines an accept-handoff condition based on the switch-off-request and a predefined accept-handoff condition.

5. The method of claim 1, further comprising:
receiving a load-request message from the neighboring small cell base station, wherein the load-request message informs the small cell base station to prepare for handoff traffic from the neighboring small cell base station; and
performing a handoff procedure with the neighboring small cell based on the load-request message.

6. The method of claim 1, wherein the exit-frozen-state event is an expiration of the freeze timer.

7. The method of claim 1, wherein the exit-frozen-state event is detecting a trigger event indicating the completion of a switch-off procedure from the neighboring small cell base station.

8. A method comprising:
receiving a switch-on-request message in a switched-off state by a small cell base station in a wireless network, wherein the switch-on-request message includes a switch-on timer value, and wherein the small cell base station turns off radio communications with user equipments (UEs) in the switched-off state;
broadcasting a switch-on-acknowledge message upon receiving the switch-on-request message, wherein the switch-on-acknowledge message includes an identifier of the small cell base station;
receiving a cell-activation-request message in the switched-off state, wherein the cell-activation-request message is in response to the switch-on-acknowledge message and includes an amount of handoff-traffic; and
performing a switch-on procedure upon receiving the cell-activation-request message, wherein the switch-on procedure involves determining a switch-on condition based the cell-activation-request message using a predefined cost-function, and wherein the cost-function tracks a total amount of handoff-traffic requested from all neighboring cells.

9. The method of claim 8, wherein the identifier of the small cell base station is an E-UTRAN Cell Global Identifier (ECGI).

10. The method of claim 8, wherein the switch-on procedure further involves:
switching on the small cell base station if the switch-on condition is positive, otherwise, staying in the switched-off state without switching on the small cell base station.

11. The method of claim 10, wherein the cost-function further tracks a frequency of switch-on requests from all neighboring small cell base stations.

12. The method of claim 10, wherein the switch-on condition is positive when the amount of handoff-traffic received by the small cell base station is greater than a predefined switch-on-traffic threshold.

13. A method comprising:
   detecting an out-of-range load condition by an active-state small cell base station in a wireless network, wherein the out-of-range load condition is a low-load condition;
   sending an energy-saving-request message to one or more neighboring cells based on the load condition, wherein the energy-saving-request message is a switch-off-request message, and wherein the switch-off-request message contains a requesting time and a freeze-timeout value;
   receiving one or more response messages from a subset of the neighboring cells;
   selecting one or more target cells based on a predefined algorithm and the received one or more response messages; and
   sending one or more energy-saving-action messages to the corresponding one or more selected target cells, wherein energy-saving-action message is a load-request message.

14. The method of claim 13, wherein a neighboring small cell is selected as the target cell if the small cell base station receives the switch-off-acknowledgment message from the neighboring small cell base station.

15. The method of claim 13, further comprising:
   sending a control-measurement message to one or more user equipment (UEs) served by the small cell base station;
   receiving one or more measurement-reports messages from each UE served by the small cell base station, wherein the measurement-reports message includes the corresponding UE's traffic load and one or more neighboring cell IDs detected by the corresponding UE;
   calculating a required handoff resource based on the one or more measurement-reports message, wherein the required handoff resource is included in the switch-off-request message;
   selecting one or more handoff cells based on the detected neighboring cell IDs received from the one or more measurement-reports; and
   sending the switch-off-request message to the selected one or more handoff cells.

16. The method of claim 13, further comprising:
   detecting a target-small-cell-fail condition, wherein the small cell base station receives no positive responses from neighboring small cell base stations; and
   performing a handoff procedure with an over-lay macro cell base station of the small cell base station.

17. A method comprising:
   detecting an out-of-range load condition by an active-state small cell base station in a wireless network;
   sending an energy-saving-request message to one or more neighboring cells based on the load condition;
   receiving one or more response messages from a subset of the neighboring cells;
   selecting one or more target cells based on a predefined algorithm and the received one or more response messages; and
   sending one or more energy-saving-action messages to the corresponding one or more selected target cells, wherein the out-of-range load condition is a high-load condition, and wherein the energy-saving-request message is a switch-on-request message, and wherein energy-saving-action message is a cell-activation-request message.

18. The method of claim 17, wherein the switch-on-acknowledge message includes an identifier of the corresponding neighbor small cell base station that sends the switch-on-acknowledge message.

19. The method of claim 18, wherein the identifier is an E-UTRAN Cell Global Identifier (ECGI).

20. The method of claim 17, wherein the target cell is selected based on the identifier.

21. The method of claim 17, further comprising:
   determining an amount of handoff-traffic upon detecting the high-load condition; and
   including a required resource information in the cell-activation-request message based on the amount of handoff-traffic.

* * * * *